United States Patent
Yan et al.

(10) Patent No.: US 11,320,167 B2
(45) Date of Patent: May 3, 2022

(54) CENTRALIZED CONTROL METHOD AND SYSTEM FOR VRV AIR CONDITIONING SYSTEM, AND COMPUTER READABLE STORAGE MEDIUM

(71) Applicants: GD MIDEA HEATING & VENTILATING EQUIPMENT CO., LTD., Foshan (CN); MIDEA GROUP CO., LTD., Foshan (CN)

(72) Inventors: Jie Yan, Foshan (CN); Rui Liang, Foshan (CN); Qiang Li, Foshan (CN)

( * ) Notice: Subject to any disclaimer, the term of this patent is extended or adjusted under 35 U.S.C. 154(b) by 0 days.

(21) Appl. No.: 17/046,792

(22) PCT Filed: Apr. 18, 2019

(86) PCT No.: PCT/CN2019/083152
§ 371 (c)(1),
(2) Date: Oct. 11, 2020

(87) PCT Pub. No.: WO2019/201287
PCT Pub. Date: Oct. 24, 2019

(65) Prior Publication Data
US 2021/0364183 A1  Nov. 25, 2021

(30) Foreign Application Priority Data
Apr. 18, 2018 (CN) .......................... 201810352712.8

(51) Int. Cl.
*F24F 11/58* (2018.01)
*F24F 11/88* (2018.01)
(Continued)

(52) U.S. Cl.
CPC .............. *F24F 11/58* (2018.01); *F24F 11/52* (2018.01); *F24F 11/88* (2018.01); *F24F 11/89* (2018.01); *H04L 67/12* (2013.01)

(58) Field of Classification Search
CPC .. F24F 11/58; F24F 11/52; F24F 11/88; F24F 11/89
See application file for complete search history.

(56) References Cited

U.S. PATENT DOCUMENTS

| 2013/0060386 A1* | 3/2013 | Cha .......................... F24F 11/61 700/278 |
| 2016/0116179 A1* | 4/2016 | Land, III ................. F24F 11/89 700/276 |

(Continued)

FOREIGN PATENT DOCUMENTS

| CN | 1928445 A | 3/2007 |
| CN | 103383128 A | 11/2013 |

(Continued)

OTHER PUBLICATIONS

OA for EP application 19787620.4.
OA for CN application 201810352712.8.
International Search Report of PCT/CN2019/083152.

*Primary Examiner* — Mohammad Ali
*Assistant Examiner* — Vincent W Chang
(74) *Attorney, Agent, or Firm* — Kilpatrick Townsend & Stockton, LLP

(57) ABSTRACT

Disclosed is a centralized control method for a VRV air conditioning system, includes a debugging terminal sending a first acquisition request to a cloud server on the basis of an identification code, the debugging terminal creating a project on the basis of system information, the debugging terminal uploading project information corresponding to the project to the cloud server, and the cloud server generates a delivery code corresponding to the project information, a centralized control device sending a second acquisition request to the cloud server on the basis of the delivery code, and the centralized control device loading the project corresponding to the delivery code on the basis of the project (Continued)

information, and activating same. Also disclosed in the present application are a centralized control system for a VRV air conditioning system and a computer readable storage medium.

10 Claims, 1 Drawing Sheet

(51) Int. Cl.
  *F24F 11/89* (2018.01)
  *F24F 11/52* (2018.01)
  *H04L 67/12* (2022.01)

(56) References Cited

U.S. PATENT DOCUMENTS

| | | | |
|---|---|---|---|
| 2017/0307246 A1 | 10/2017 | Ohara et al. | |
| 2018/0224819 A1* | 8/2018 | Noboa | F24F 11/30 |
| 2019/0212022 A1* | 7/2019 | Aeberhard | G05B 19/0428 |
| 2019/0363576 A1* | 11/2019 | Wester | F24F 11/30 |
| 2019/0379733 A1* | 12/2019 | Huang | H04L 41/0853 |

FOREIGN PATENT DOCUMENTS

| | | |
|---|---|---|
| CN | 103994555 A | 8/2014 |
| CN | 104359196 A | 2/2015 |
| CN | 104633852 A | 5/2015 |
| CN | 106288139 A | 1/2017 |
| CN | 107143976 A | 9/2017 |
| CN | 108562024 A | 9/2018 |
| JP | 2016196978 A | 11/2016 |
| JP | 2017163221 A | 9/2017 |
| KR | 20050074827 A | 7/2005 |
| KR | 20130014159 A | 2/2013 |
| KR | 20160131507 A | 11/2016 |

* cited by examiner

CENTRALIZED CONTROL METHOD AND SYSTEM FOR VRV AIR CONDITIONING SYSTEM, AND COMPUTER READABLE STORAGE MEDIUM

CROSS-REFERENCES TO RELATED APPLICATIONS

The present disclosure is a national phase application of International Application No. PCT/CN2019/083152, filed on Apr. 18, 2019, which claims priority to and benefits of Chinese Patent Application Serial No. 201810352712.8, filed with the National Intellectual Property Office Administration of P. R. China on Apr. 18, 2018, the entire content of which is incorporated herein by reference.

FIELD

The present disclosure relates to a field of air conditioners, and more particularly to a centralized control method for a multi-split air conditioning system, a centralized control system for a multi-split air conditioning system and a computer-readable storage medium.

BACKGROUND

With the rapid development of air conditioning technology, a multi-split air conditioning system has been widely applied. Generally, the multi-split air conditioning system includes one or more outdoor units and a plurality of indoor units. In an engineering project where the multi-split air conditioning system is used in a commercial occasion such as in a hotel or in a shopping mall, in order to improve the efficiency for managing the outdoor units and/or the indoor units in the multi-split air conditioning system, it is required to centrally monitor and control the outdoor units and/or indoor units of the multi-split air conditioning system.

In the existing multi-split air conditioning system, a centralized control of the outdoor units and/or the indoor units in the multi-split air conditioning system is realized via wired or wireless communication. However, when the wired communication is used, the wiring of the indoor units of the multi-split air conditioning system may be very complex. When the wireless communication is used, a complex debugging process is required. Moreover, the complexity of the indoor building structure will bring instabilities to the wireless communication. Therefore, a process for realizing the centralized control of the multi-split air conditioning system may be complex.

SUMMARY

The present disclosure seeks to solve the problem of the complexity in realizing the centralized control of the multi-split air conditioning system. Accordingly, an embodiment of the present disclosure is to provide a centralized control method for a multi-split air conditioning system, a centralized control system for a multi-split air conditioning system and a computer-readable storage medium.

In order to achieve the above embodiment, the present disclosure provides in embodiments a centralized control method for a multi-split air conditioning system, the centralized control method for the multi-split air conditioning system includes:

upon acquiring an identification code of an outdoor unit of the multi-split air conditioning system, sending, by a debugging terminal, a first acquisition request to a cloud server on the basis of the identification code, search for system information of the multi-split air conditioning system corresponding to the identification code and send the system information to the debugging terminal;

upon receiving the system information sent by the cloud server, creating, by the debugging terminal, a project on the basis of the system information;

upon creating the project, uploading, by the debugging terminal, project information corresponding to the project to the cloud server, generate a delivery code corresponding to the project information and to store the delivery code and the project information in association with each other;

when a centralized control device corresponding to the multi-split air conditioning system receives the delivery code, sending, by the centralized control device, a second acquisition request to the cloud server on the basis of the delivery code, to allow the cloud server to send the project information corresponding to the delivery code to the centralized control device; and upon receiving the project information, loading, by the centralized control device, the project corresponding to the delivery code on the basis of the project information, and activating the project by the centralized control device.

In an embodiment, after a step of upon receiving the project information, loading, by the centralized control device, the project corresponding to the delivery code on the basis of the project information, and activating the project by the centralized control device, the centralized control method for the multi-split air conditioning system further includes:

upon receiving an addition request of the outdoor unit or an indoor unit, updating, by the centralized control device, the project information on the basis of addition information corresponding to the addition request; and uploading, by the centralized control device, updated project information to the cloud server store the updated project information.

In an embodiment, after a step of upon receiving the project information, loading, by the centralized control device, the project corresponding to the delivery code on the basis of the project information, and activating the project by the centralized control device, the centralized control method for the multi-split air conditioning system further includes:

sending, by the centralized control device, successful activation information to the cloud server block the debugging terminal corresponding to the delivery code.

In an embodiment, a step of upon acquiring the identification code of the outdoor unit of the multi-split air conditioning system, sending, by the debugging terminal, the first acquisition request to the cloud server on the basis of the identification code, to allow the cloud server to search for system information of the multi-split air conditioning system corresponding to the identification code and send the system information to the debugging terminal includes:

upon acquiring the identification code of the outdoor unit of the multi-split air conditioning system, sending, by the debugging terminal, the first acquisition request to the cloud server on the basis of the identification code;

determining, by the cloud server, on the basis of the first acquisition request, whether the debugging terminal is currently blocked; and searching for, by the cloud server, the system information of the multi-split air conditioning system corresponding to the identification code and sending, by the cloud server, the system information to the debugging terminal when the debugging terminal is not currently blocked.

In an embodiment, a step of searching for, by the cloud server, the system information of the multi-split air conditioning system corresponding to the identification code and sending, by the cloud server, the system information to the debugging terminal when the debugging terminal is not currently blocked includes:

determining, by the cloud server, whether the system information corresponding to the identification code exists in a preset database when the debugging terminal is not currently blocked;

sending, by the cloud server, the system information corresponding to the identification code to the debugging terminal when the system information corresponding to the identification code exists in the preset database; and sending, by the cloud server, identification code error information to the debugging terminal when the system information corresponding to the identification code does not exist in the preset database.

In an embodiment, a step of upon creating the project, uploading, by the debugging terminal, project information corresponding to the project to the cloud server, to allow the cloud server to generate the delivery code corresponding to the project information and to store the delivery code and the project information in association with each other includes:

upon creating the project, performing, by the debugging terminal, a corresponding processing on the project on the basis of the system information; and upon completing the processing, uploading, by the debugging terminal, the project information corresponding to the project to the cloud server.

In an embodiment, before a step of upon acquiring the identification code of the outdoor unit of the multi-split air conditioning system, sending, by the debugging terminal, the first acquisition request to the cloud server on the basis of the identification code, the centralized control method for the multi-split air conditioning system further includes:

upon the installation of the multi-split air conditioning system, sending, by the outdoor unit of the multi-split air conditioning system, the identification code of the outdoor unit and the system information of the multi-split air conditioning system to the cloud server; and storing, by the cloud server, the identification code and the system information received in association with each other.

In an embodiment, the outdoor unit is provided with a mobile communication module, and the outdoor unit is communicated with the cloud server via the mobile communication module.

Further, in order to achieve the above embodiment, the present disclosure provides in embodiments a centralized control system for a multi-split air conditioning system. The centralized control system for the multi-split air conditioning system includes: a memory, a processor, and a centralized control program of the multi-split air conditioning system stored in the memory and executable by the processor that, when executed by the processor, causes the processor to perform steps of a centralized control method for a multi-split air conditioning system according to any one of the above embodiments.

Further, in order to achieve the above embodiment, the present disclosure provides in embodiments a computer-readable storage medium having stored therein a centralized control program of a multi-split air conditioning system that, when executed by a processor, causes the processor to perform steps of a centralized control method for a multi-split air conditioning system according to any one of the above embodiments.

In the present disclosure, upon acquiring the identification code of the outdoor unit of the multi-split air conditioning system, the debugging terminal sends the first acquisition request to the cloud server on the basis of the identification code, search for system information of the multi-split air conditioning system corresponding to the identification code and send the system information to the debugging terminal. Upon receiving the system information sent by the cloud server, the debugging terminal creates the project on the basis of the system information. Upon creating the project, the debugging terminal uploads project information corresponding to the project to the cloud server, generate the delivery code corresponding to the project information and to store the delivery code and the project information in association with each other. When the centralized control device corresponding to the multi-split air conditioning system receives the delivery code, the centralized control device sends the second acquisition request to the cloud server on the basis of the delivery code, send the project information corresponding to the delivery code to the centralized control device. Upon receiving the project information, the centralized control device loads the project corresponding to the delivery code on the basis of the project information, and activates the project. The centralized control device loads the project created by the debugging terminal through the cloud server, thus realizing the centralized supervision and management of the multi-split air conditioning system without communication wiring or network debugging, simplifying the procedure of the centralized supervision and management of the multi-split air conditioning system, and improving the efficiency of the centralized supervision and management of the multi-split air conditioning system.

The implementations, functional characteristics and advantages of the present disclosure will be further described in conjunction with embodiments and with reference to accompanying drawings.

DETAILED DESCRIPTION OF THE DISCLOSURE

It should be understood that embodiments described herein are explanatory, and used to generally understand the present disclosure. The embodiments shall not be construed to limit the present disclosure.

Figure 1:
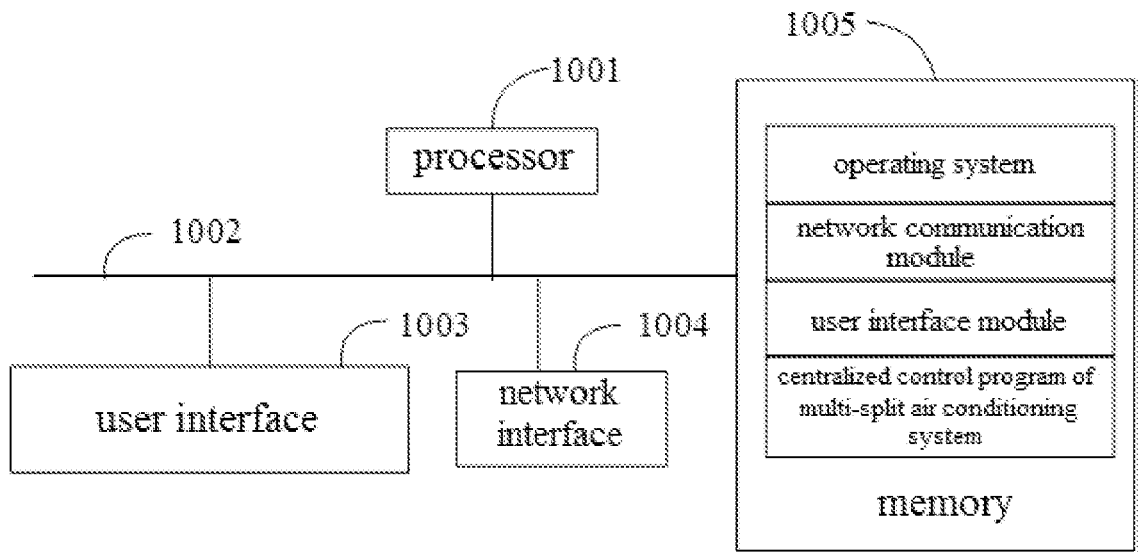
FIG. 1 is a schematic structural diagram of a centralized control system of a multi-split air conditioning system in a hardware operating environment involved in a solution of an embodiment of the present disclosure.

As shown in FIG. 1, a schematic structural diagram of a centralized control system of a multi-split air conditioning system in a hardware operating environment involved in a solution of an embodiment of the present disclosure is illustrated.

A terminal in the embodiments of the present disclosure may be a movable terminal device with a display function, such as a PC, a smart phone, a tablet computer, an e-book reader, an MP3 (Moving Picture Experts Group Audio Layer III) player, an MP4 (Moving Picture Experts Group Audio Layer IV) player and a portable computer.

As shown in FIG. 1, the terminal includes a processor 1001, such as a CPU, a network interface 1004, a user interface 1003, a memory 1005, and a communication bus 1002. The communication bus 1002 is configured to establish connection and communication among these components. The user interface 1003 may include a display screen and an input unit such as a keyboard. Alternatively, the user interface 1003 may also include a standard wired interface or a wireless interface. The network interface 1004 may include a standard wired interface or a wireless interface (such as a WIFI interface). The memory 1005 may be a high-speed RAM memory or a stable memory (non-volatile memory), such as a magnetic disk memory. In one embodiment, the memory 1005 may also be a memory device independent of the processor 1001.

In one embodiment, the terminal may also include a camera, an RF (radio frequency) circuit, a sensor, an audio circuit, a WiFi module, and the like. The sensor may be a light sensor or a motion sensor. In one embodiment, the light sensor may include an ambient light sensor and a proximity sensor. The ambient light sensor is able to adjust brightness of the display screen according to brightness of the ambient light. The proximity sensor is able to turn off the display screen and/or backlight when the mobile terminal approach to the ear. A gravity acceleration sensor, as a kind of the motion sensor, is able to detect an acceleration magnitude in different directions (usually in three dimensional axis directions), and is able to detect magnitude and direction of gravity when it is stationary. It may be applied to recognize a posture of a mobile terminal (such as a switch between horizontal display and vertical display, a related game, a magnetometer posture calibration), and to realize functions related to vibration recognition (such as pedometer and percussion). The mobile terminal may also be equipped with other sensors such as a gyroscope, a barometer, a hygrometer, a thermometer and an infrared sensor which will not be described in detail herein.

The terminal structure shown in FIG. 1 shall not be construed to limit the terminal. The terminal may include more or fewer components than shown in FIG. 1, or may include any combination of these components or different component arrangements.

As shown in FIG. 1, the memory 1005 as a computer storage medium may include an operating system, a network communication module, a user interface module, and a centralized control program of a multi-split air conditioning system.

In the terminal shown in FIG. 1, the network interface 1004 is configured to connect to a background server and perform data communication with the background server. The user interface 1003 is configured to connect to a client terminal (user side) and perform data communication with the client terminal. The processor 1001 is configured to call the centralized control program of the multi-split air conditioning system stored in the memory 1005.

In an embodiment, the centralized control system of the multi-split air-conditioning system includes: a memory 1005, a processor 1001 and a centralized control program of the multi-split air conditioning system stored in the memory 1005 and executable by the processor 1001 that, when executed by the processor 1001, causes the processor 1001 to perform the following operations:

upon acquiring an identification code of an outdoor unit of the multi-split air conditioning system, sending, by a debugging terminal, a first acquisition request to a cloud server on the basis of the identification code, search for system information of the multi-split air conditioning system corresponding to the identification code and send the system information to the debugging terminal;

upon receiving the system information sent by the cloud server, creating, by the debugging terminal, a project on the basis of the system information;

upon creating the project, uploading, by the debugging terminal, project information corresponding to the project to the cloud server, generate a delivery code corresponding to the project information and to store the delivery code and the project information in association with each other;

when a centralized control device corresponding to the multi-split air conditioning system receives the delivery code, sending, by the centralized control device, a second acquisition request to the cloud server on the basis of the delivery code, to allow the cloud server to send the project information corresponding to the delivery code to the centralized control device; and upon receiving the project information, loading, by the centralized control device, the project corresponding to the delivery code on the basis of the project information, and activating the project by the centralized control device.

Further, the processor 1001 may call the centralized control program of the multi-split air conditioning system stored in the memory 1005 to perform the following operations:

upon receiving an addition request of the outdoor unit or an indoor unit, updating, by the centralized control device, the project information on the basis of addition information corresponding to the addition request; and uploading, by the centralized control device, updated project information to the cloud server store the updated project information.

Further, the processor 1001 may call the centralized control program of the multi-split air conditioning system stored in the memory 1005 to perform the following operation:

sending, by the centralized control device, successful activation information to the cloud server block the debugging terminal corresponding to the delivery code.

Further, the processor 1001 may call the centralized control program of the multi-split air conditioning system stored in the memory 1005 to perform the following operations:

upon acquiring the identification code of the outdoor unit of the multi-split air conditioning system, sending, by the debugging terminal, the first acquisition request to the cloud server on the basis of the identification code;

determining, by the cloud server, on the basis of the first acquisition request, whether the debugging terminal is currently blocked; and searching for, by the cloud server, the system information of the multi-split air conditioning system corresponding to the identification code and sending, by the cloud server, the system information to the debugging terminal when the debugging terminal is not currently blocked.

Further, the processor 1001 may call the centralized control program of the multi-split air conditioning system stored in the memory 1005 to perform the following operations:

determining, by the cloud server, whether the system information corresponding to the identification code exists in a preset database when the debugging terminal is not currently blocked;

sending, by the cloud server, the system information corresponding to the identification code to the debugging terminal when the system information corresponding to the identification code exists in the preset database; and sending, by the cloud server, identification code error information to the debugging terminal when the system information corresponding to the identification code does not exist in the preset database.

Further, the processor 1001 may call the centralized control program of the multi-split air conditioning system stored in the memory 1005 to perform the following operations:

upon creating the project, performing, by the debugging terminal, a corresponding processing on the project on the basis of the system information; and upon completing the processing, uploading, by the debugging terminal, the project information corresponding to the project to the cloud server.

Further, the processor 1001 may call the centralized control program of the multi-split air conditioning system stored in the memory 1005 to perform the following operations:

upon the installation of the multi-split air conditioning system, sending, by the outdoor unit of the multi-split air conditioning system, the identification code of the outdoor unit and the system information of the multi-split air conditioning system to the cloud server; and storing, by the cloud server, the identification code and the system information received in association with each other.

Figure 2:
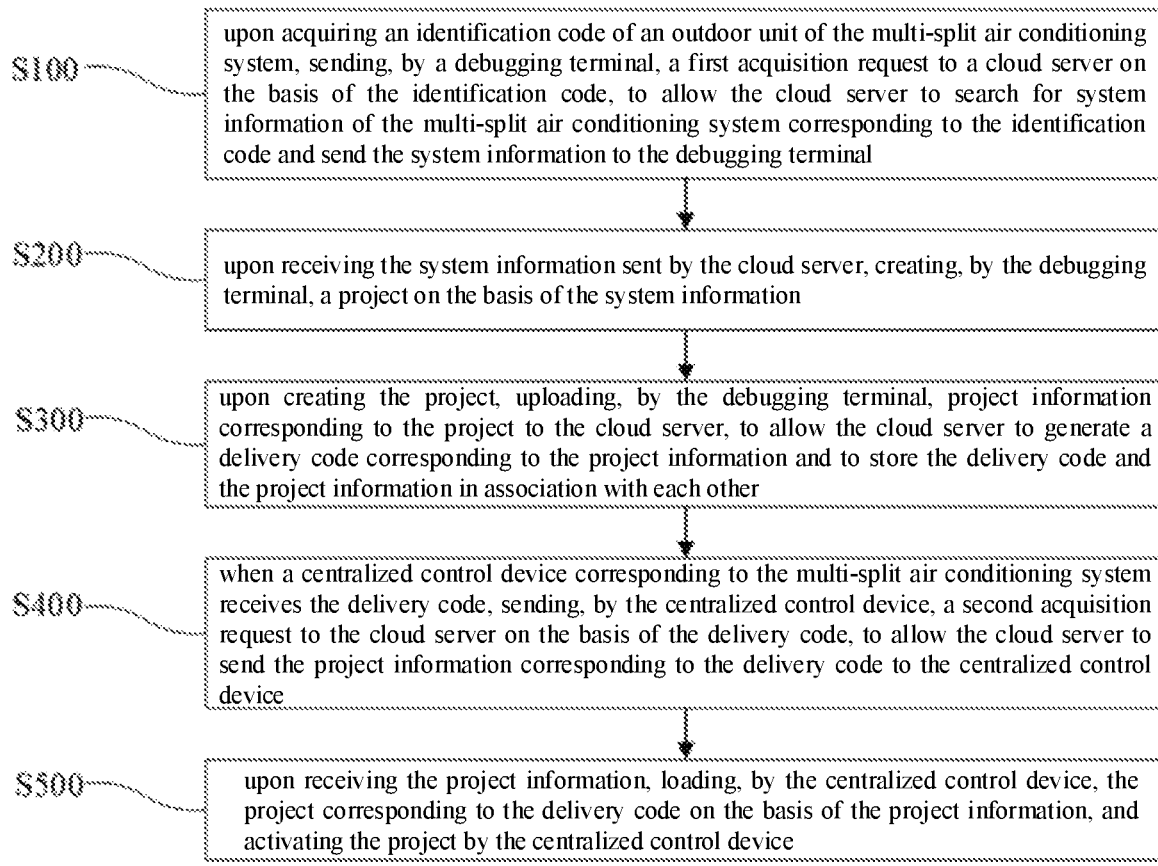
FIG. 2 is a flow chart of a centralized control method for a multi-split air conditioning system according to an embodiment of the present disclosure.

The present disclosure also provide a centralized control method for a multi-split air conditioning system, as shown in FIG. 2 which refers to a flow chart of a centralized control method for a multi-split air conditioning system according to an embodiment of the present disclosure.

In an embodiment, the centralized control method for the multi-split air conditioning system includes the following steps.

In S100, upon acquiring an identification code of an outdoor unit of the multi-split air conditioning system, a debugging terminal sends a first acquisition request to a cloud server on the basis of the identification code, search for system information of the multi-split air conditioning system corresponding to the identification code and send the system information to the debugging terminal.

In one embodiment, the debugging terminal may be a mobile terminal such as a mobile phone and a proprietary terminal for a multi-split air conditioning system, and a communication connection has been established between the debugging terminal and the cloud server.

In the embodiment, after both outdoor unit and indoor unit of the multi-split air conditioning system are installed, a debugging technicist may use an APP corresponding to the centralized control method of the multi-split air conditioning system installed in the debugging terminal to scan an identification code of the outdoor unit. The identification code is a unique identification code of the outdoor unit, which is linked to the outdoor unit after the product leaves the factory. After the identification code of the outdoor unit is acquired, the debugging terminal sends the first acquisition request to the cloud server based on the APP and the identification code. For example, the first acquisition request including the identification code is sent to the cloud server through the APP. Upon receiving the first acquisition request, the cloud server searches for/seeks the system information corresponding to the identification code, and sends the system information that has been found to the debugging terminal. For example, all of the system information of the multi-split system and the identification codes of the outdoor units may be associated and stored in a preset database, and the cloud server can search the preset database for the system information corresponding to the identification code.

It should be noted that the system information of the multi-split air conditioning system includes outdoor unit information and indoor unit information.

In S200, upon receiving the system information sent by the cloud server, the debugging terminal creates a project on the basis of the system information.

In the embodiment, upon receiving the system information sent by the cloud server, the debugging terminal creates the project based on the system information, by means of adding outdoor unit(s) based on the outdoor unit information of the system information, and adding indoor unit(s) based on the indoor unit information of the system information. After the creation is completed, the indoor units can be named and grouped to complete the project.

In S300, upon creating the project, the debugging terminal uploads project information corresponding to the project to the cloud server, generate a delivery code corresponding to the project information and to store the delivery code and the project information in association with each other.

In the embodiment, when the project is created, the debugging terminal uploads the project information of the project to the cloud server. When the cloud server receives the project information, it generates the delivery code based on the project information, and stores the delivery code and the project information of the project so that the project information can be subsequently called.

In S400, when a centralized control device corresponding to the multi-split air conditioning system receives the delivery code, the centralized control device sends a second acquisition request to the cloud server on the basis of the delivery code, to allow the cloud server to send the project information corresponding to the delivery code to the centralized control device.

In the embodiment, the centralized control device corresponding to the multi-split air conditioning system refers to a management and control device of the multi-split air conditioning system corresponding to the client, for example, a server of a management center of a multi-split air conditioning system applied in commercial occasions such as a hotel and a shopping mall. After the project is created by the debugging technicist via the debugging terminal, the generated delivery code may be sent to a manager of the management center, and the manager can input the delivery code on the delivery code input interface of the centralized control device.

Upon receiving the delivery code, the centralized control device sends the second acquisition request to the cloud server based on the delivery code, and the cloud server searches for the corresponding project information according to the delivery code, and sends the project information to the centralized control device. For example, all of the project information and the delivery code may be associated and stored in a preset database, and the cloud server can search the preset database for the project information corresponding to the delivery code.

In S500, upon receiving the project information, the centralized control device loads the project corresponding to the delivery code on the basis of the project information, and activates the project by the centralized control device.

In the embodiment, the centralized control device loads the project corresponding to the delivery code based on the project information, and activates the project, so that the manager can manage the outdoor units and the indoor units of the multi-split air conditioning system via the centralized control device.

Further, in an embodiment, after S500, the centralized control method for the multi-split air conditioning system further includes sending, by the centralized control device, successful activation information to the cloud server block the debugging terminal corresponding to the delivery code.

Since the debugging terminal corresponding to the delivery code is blocked by the cloud server, the cloud server does not need to send information about the project to the debugging terminal, to ensure the security of user data and interactive data of the multi-split air conditioning system.

The present disclosure provides the centralized control method for the multi-split air conditioning system in the embodiment. Upon acquiring the identification code of the outdoor unit of the multi-split air conditioning system, the debugging terminal sends the first acquisition request to the cloud server on the basis of the identification code, search for system information of the multi-split air conditioning system corresponding to the identification code and send the system information to the debugging terminal. Upon receiving the system information sent by the cloud server, the debugging terminal creates the project on the basis of the system information. Upon creating the project, the debugging terminal uploads project information corresponding to the project to the cloud server, generate the delivery code corresponding to the project information and to store the delivery code and the project information in association with each other. When the centralized control device corresponding to the multi-split air conditioning system receives the delivery code, the centralized control device sends the second acquisition request to the cloud server on the basis of the delivery code, send the project information corresponding to the delivery code to the centralized control device. Upon receiving the project information, the centralized control device loads the project corresponding to the delivery code on the basis of the project information, and activates the project. The centralized control device loads the project created by the debugging terminal through the cloud server, thus realizing the centralized supervision and management of the multi-split air conditioning system without communication wiring or network debugging, simplifying the procedure of the centralized supervision and management of the multi-split air conditioning system, and improving the efficiency of the centralized supervision and management of the multi-split air conditioning system.

On the basis of the first embodiment, the present disclosure provides a centralized control method for a multi-split air conditioning system in a second embodiment. In the embodiment, after S500, the centralized control method for the multi-split air conditioning system further includes the following steps.

In S600, upon receiving an addition request of the outdoor unit or an indoor unit, the centralized control device updates the project information on the basis of addition information corresponding to the addition request.

In the embodiment, a manager of the multi-split air conditioning system may add indoor unit or outdoor unit in the project via the centralized control device. In one embodiment, upon receiving the addition request of the outdoor unit or the indoor unit, the centralized control device updates the project information on the basis of addition information corresponding to the addition request. That is, the indoor unit or the outdoor unit is added in the project, and is further named and grouped.

In S700, the centralized control device uploads updated project information to the cloud server store the updated project information.

In the embodiment, after the addition, the centralized control device uploads the updated project information to the cloud server, store the updated project information. In one embodiment, the cloud server can replace the project information before the update with the updated project information.

It should be noted that the manager of the multi-split air conditioning system can delete the indoor unit or the outdoor unit of the project via the centralized control device. A procedure of the deletion is similar to that of the addition, which is not described in detail herein.

The debugging technicist may also add indoor or outdoor units via the debugging terminal. When the addition is completed by the debugging terminal, the debugging terminal uploads the updated project information to the cloud server, and the cloud server replaces the project information before the update with the updated project information, and sends the updated project information to the corresponding centralized control device, to allow the centralized control device to replace the project information before the update with the updated project information to realize the addition of the outdoor or indoor unit.

In the centralized control method of the multi-split air conditioning system provided in the embodiment, upon receiving an addition request of the outdoor unit or an indoor unit, the centralized control device updates the project information on the basis of addition information corresponding to the addition request. Then, the centralized control device uploads updated project information to the cloud server store the updated project information. On this basis, the centralized control device may control the newly added outdoor or indoor unit of the multi-split air conditioning system, thus improving the efficiency for managing the multi-split air conditioning system.

On the basis of the second embodiment, the present disclosure provides a centralized control method for a multi-split air conditioning system in a third embodiment. In the embodiment, S100 includes the following steps.

In S110, upon acquiring the identification code of the outdoor unit of the multi-split air conditioning system, the debugging terminal sends the first acquisition request to the cloud server on the basis of the identification code.

In S120, the cloud server determines on the basis of the first acquisition request whether the debugging terminal is currently blocked.

In S130, the cloud server searches for the system information of the multi-split air conditioning system corresponding to the identification code and the cloud server sends the system information to the debugging terminal when the debugging terminal is not currently blocked.

In the embodiment, after both outdoor unit and indoor unit of the multi-split air conditioning system are installed, the debugging technicist may use an APP corresponding to the centralized control method of the multi-split air conditioning system installed in the debugging terminal to scan the identification code of the outdoor unit. The identification code is a unique identification code of the outdoor unit, which is linked to the outdoor unit after the product leaves the factory. After the identification code of the outdoor unit is acquired, the debugging terminal sends the first acquisition request to the cloud server based on the APP and the identification code. For example, the first acquisition request including the identification code is sent to the cloud server through the APP. Upon receiving the first acquisition request, the cloud server determines on the basis of the first acquisition request whether the debugging terminal is currently blocked. When the debugging terminal is not currently blocked, the cloud server searches for/seeks the system information corresponding to the identification code, and sends the system information that has been found to the debugging terminal. For example, all of the system information of the multi-split system and the identification codes of the outdoor units may be associated and stored in a preset database, and the cloud server can search the preset database for the system information corresponding to the identification code.

In the centralized control method of the multi-split air conditioning system provided in the embodiment, upon acquiring the identification code of the outdoor unit of the multi-split air conditioning system, the debugging terminal sends the first acquisition request to the cloud server on the basis of the identification code. Then, the cloud server determines on the basis of the first acquisition request whether the debugging terminal is currently blocked. When the debugging terminal is not currently blocked, the cloud server searches for the system information of the multi-split air conditioning system corresponding to the identification code and the cloud server sends the system information to the debugging terminal. On this basis, the system information may be sent to the debugging terminal when the debugging terminal is not blocked, avoiding sending the system information to the debugging terminal that has been blocked. The security of user data and interactive data of the multi-split air conditioning system may be guaranteed, thus further improving the efficiency for managing the multi-split air conditioning system.

On the basis of the third embodiment, the present disclosure provides a centralized control method for a multi-split air conditioning system in a fourth embodiment. In the embodiment, S130 includes the following steps.

In S131, the cloud server determines whether the system information corresponding to the identification code exists in a preset database when the debugging terminal is not currently blocked.

In S132, the cloud server sends the system information corresponding to the identification code to the debugging terminal when the system information corresponding to the identification code exists in the preset database.

In S133, the cloud server sends identification code error information to the debugging terminal when the system information corresponding to the identification code does not exist in the preset database.

In the embodiment, when the debugging terminal is not currently blocked, the cloud server determines whether the system information corresponding to the identification code exists in the preset database, i.e., verifies the identification code, to confirm that the system information corresponding to the identification code exists. When the system information corresponding to the identification code exists in the preset database, the cloud server sends the system information corresponding to the identification code to the debugging terminal. When the system information corresponding to the identification code does not exist in the preset database, the cloud server sends identification code error information to the debugging terminal to prompt the debugging technicist to resend the identification code.

In the centralized control method of the multi-split air conditioning system provided in the embodiment, the cloud server determines whether the system information corresponding to the identification code exists in the preset database when the debugging terminal is not currently blocked. When the system information corresponding to the identification code exists in the preset database, the cloud server sends the system information corresponding to the identification code to the debugging terminal. When the system information corresponding to the identification code does not exist in the preset database, the cloud server sends identification code error information to the debugging terminal. By verifying the identification code, it is possible to ensure that the cloud server sends correct system information to the debugging terminal. When the verification fails, it prompts the debugging technicist of the debugging terminal that the currently sent identification code is incorrect, thus further improving the efficiency for managing the multi-split air conditioning system.

On the basis of the first embodiment, the present disclosure provides a centralized control method for a multi-split air conditioning system in a fifth embodiment. In the embodiment, S300 includes the following steps.

In S310, upon creating the project, the debugging terminal performs a corresponding processing on the project on the basis of the system information.

In S320, upon completing the processing, the debugging terminal uploads the project information corresponding to the project to the cloud server.

In the embodiment, after the project is created, the debugging terminal performs the corresponding processing on the project on the basis of the system information. In one embodiment, the indoor units may be named or grouped according to the system information, to complete the project. After the processing, the debugging terminal uploads the project information corresponding to the project to the cloud server. When the cloud server receives the project information uploaded by the debugging terminal, it generates the delivery code on the basis of the project information, and stores the delivery code and the project information of the project in association with each other, so that the project information can be subsequently called.

In the centralized control method of the multi-split air conditioning system provided in the embodiment, upon creating the project, the debugging terminal performs the corresponding processing on the project on the basis of the system information. Upon completing the processing, the debugging terminal uploads the project information corresponding to the project to the cloud server. On this basis, the indoor units of the multi-split air conditioning system may be subjected to further operations, for example, be named or grouped, to facilitate the further management of the indoor units of the multi-split air conditioning system via the centralized control device, thus further improving the efficiency for managing the multi-split air conditioning system.

On the basis of the first embodiment, the present disclosure provides a centralized control method for a multi-split air conditioning system in a sixth embodiment. In the embodiment, before S100, the centralized control method includes the following steps.

In S800, upon the installation of the multi-split air conditioning system, the outdoor unit of the multi-split air conditioning system sends the identification code of the outdoor unit and the system information of the multi-split air conditioning system to the cloud server.

In S900, the cloud server stores the identification code and the system information received in association with each other.

In the embodiment, after the multi-split air conditioning system is installed, the outdoor unit of the multi-split air conditioning system sends the identification code of the outdoor unit and the system information of the multi-split air conditioning system to the cloud server. The cloud server stores the identification code and the system information received in association with each other, to allow the debugging terminal to call the system information of the multi-split air conditioning system. When the multi-split air conditioning system is installed, communication between the outdoor unit and the indoor unit of the multi-split air conditioning system has been established, and the outdoor unit may acquire the information of the indoor unit.

In one embodiment, the outdoor unit is provided with a mobile communication module, and the outdoor unit is in communication with the cloud server via the mobile communication module, and the mobile communication module includes a 2G/3G/4G/5G module.

It should be noted that when the multi-split air conditioning system includes a plurality of outdoor units, one of the outdoor units may be selected as a host according to a preset principle, and the system information may be sent to the cloud server through the host. For example, any outdoor unit may be randomly selected from the plurality of outdoor units as the host.

In the centralized control method of the multi-split air conditioning system provided in the embodiment, after the multi-split air conditioning system is installed, the outdoor unit of the multi-split air conditioning system sends the identification code of the outdoor unit and the system information of the multi-split air conditioning system to the cloud server. The cloud server stores the identification code and the system information received in association with each other. On this basis, the system information of the multi-split air conditioning system and the identification code of the outdoor unit may be sent to the cloud server via the outdoor unit of the multi-split air conditioning system, and are associated and stored in the cloud server, to allow the debugging terminal to call the system information of the multi-split air conditioning system through the cloud server, thus improving the efficiency for managing the multi-split air conditioning system.

In addition, the present disclosure provides in embodiments a computer-readable storage medium having stored therein a centralized control program of a multi-split air conditioning system that, when executed by a processor, causes the processor to perform the following steps:

upon acquiring an identification code of an outdoor unit of the multi-split air conditioning system, sending, by a debugging terminal, a first acquisition request to a cloud server on the basis of the identification code, search for system information of the multi-split air conditioning system corresponding to the identification code and send the system information to the debugging terminal;

upon receiving the system information sent by the cloud server, creating, by the debugging terminal, a project on the basis of the system information;

upon creating the project, uploading, by the debugging terminal, project information corresponding to the project to the cloud server, generate a delivery code corresponding to the project information and to store the delivery code and the project information in association with each other;

when a centralized control device corresponding to the multi-split air conditioning system receives the delivery code, sending, by the centralized control device, a second acquisition request to the cloud server on the basis of the delivery code, to allow the cloud server to send the project information corresponding to the delivery code to the centralized control device; and upon receiving the project information, loading, by the centralized control device, the project corresponding to the delivery code on the basis of the project information, and activating the project by the centralized control device.

Further, when the centralized control program of the multi-split air conditioning system is executed by the processor, it causes the processor to perform the following operations:

upon receiving an addition request of the outdoor unit or an indoor unit, updating, by the centralized control device, the project information on the basis of addition information corresponding to the addition request; and uploading, by the centralized control device, updated project information to the cloud server store the updated project information.

Further, when the centralized control program of the multi-split air conditioning system is executed by the processor, it causes the processor to perform the following operation:

sending, by the centralized control device, successful activation information to the cloud server block the debugging terminal corresponding to the delivery code Further, when the centralized control program of the multi-split air conditioning system is executed by the processor, it causes the processor to perform the following operations:

upon acquiring the identification code of the outdoor unit of the multi-split air conditioning system, sending, by the debugging terminal, the first acquisition request to the cloud server on the basis of the identification code;

determining, by the cloud server, on the basis of the first acquisition request, whether the debugging terminal is currently blocked; and searching for, by the cloud server, the system information of the multi-split air conditioning system corresponding to the identification code and sending, by the cloud server, the system information to the debugging terminal when the debugging terminal is not currently blocked.

Further, when the centralized control program of the multi-split air conditioning system is executed by the processor, it causes the processor to perform the following operations:

determining, by the cloud server, whether the system information corresponding to the identification code exists in a preset database when the debugging terminal is not currently blocked;

sending, by the cloud server, the system information corresponding to the identification code to the debugging terminal when the system information corresponding to the identification code exists in the preset database; and sending, by the cloud server, identification code error information to the debugging terminal when the system information corresponding to the identification code does not exist in the preset database.

Further, when the centralized control program of the multi-split air conditioning system is executed by the processor, it causes the processor to perform the following operations:

upon creating the project, performing, by the debugging terminal, a corresponding processing on the project on the basis of the system information; and upon completing the processing, uploading, by the debugging terminal, the project information corresponding to the project to the cloud server.

Further, when the centralized control program of the multi-split air conditioning system is executed by the processor, it causes the processor to perform the following operations:

upon the installation of the multi-split air conditioning system, sending, by the outdoor unit of the multi-split air conditioning system, the identification code of the outdoor unit and the system information of the multi-split air conditioning system to the cloud server; and storing, by the cloud server, the identification code and the system information received in association with each other.

It should be noted that in this article, term "include", "include" or any other variants thereof are not intended to exclude other elements which are not mentioned in the present disclosure. A process, method, product or system includes a series of elements, except for these elements, it may also include other elements that are not explicitly listed, or elements inherent to the process, method, product, or system. An element may be defined by following a phrase of "including a", with specific restrictions, it does not exclude the case where the process, method, product or system includes another same element.

Serial numbers of the above embodiments of the present disclosure are only for description.

With the description of the above embodiments, the method of the embodiments may be implemented by means of software and necessary general hardware platform, or be implemented by hardware. The former is applied in more situations. On this basis, the contributions made by the technical solution of the present disclosure to the existing technology may be embodied in a form of a software product. A computer software product may be stored in a storage medium (such as ROM/RAM, magnetic disk, CD), and include several instructions to make a terminal device (such as a mobile phone, a computer, a server, an air conditioner, or a network device) execute the method described in each embodiment of the present disclosure.

What is claimed is:

1. A centralized control method for a multi-split air conditioning system comprises:
    upon acquiring an identification code of an outdoor unit of the multi-split air conditioning system, sending, by a debugging terminal, a first acquisition request to a cloud server based on the identification code;
    searching, by the cloud server, for system information of the multi-split air conditioning system corresponding to the identification code and sending the system information to the debugging terminal;
    upon receiving the system information sent by the cloud server, creating, by the debugging terminal, a project based on the system information;
    upon creating the project, uploading, by the debugging terminal, project information corresponding to the project to the cloud server;
    generating, by the cloud server, a delivery code corresponding to the project information and storing the delivery code and the project information in association with each other;
    when a centralized control device corresponding to the multi-split air conditioning system receives the delivery code, sending, by the centralized control device, a second acquisition request to the cloud server based on the delivery code;
    sending, by the cloud server, the project information corresponding to the delivery code to the centralized control device; and
    upon receiving the project information, loading, by the centralized control device, the project corresponding to the delivery code based on the project information, and activating the project by the centralized control device.

2. The centralized control method for the multi-split air conditioning system according to claim 1, wherein after upon receiving the project information, loading, by the centralized control device, the project corresponding to the delivery code based on the project information, and activating the project by the centralized control device, the centralized control method for the multi-split air conditioning system further comprises:
    upon receiving an addition request of the outdoor unit or an indoor unit, updating, by the centralized control device, the project information based on addition information corresponding to the addition request;
    uploading, by the centralized control device, updated project information to the cloud server; and
    storing, by the cloud server, the updated project information.

3. The centralized control method for the multi-split air conditioning system according to claim 1, wherein after upon receiving the project information, loading, by the centralized control device, the project corresponding to the delivery code based on the project information, and activating the project by the centralized control device, the centralized control method for the multi-split air conditioning system further comprises:
    sending, by the centralized control device, successful activation information to the cloud server; and
    blocking, by the cloud server, the debugging terminal corresponding to the delivery code.

4. The centralized control method for the multi-split air conditioning system according to claim 1, wherein searching, by the cloud server, for system information of the multi-split air conditioning system corresponding to the identification code and sending the system information to the debugging terminal comprises:
    determining, by the cloud server, based on the first acquisition request, whether the debugging terminal is currently blocked; and
    searching for, by the cloud server, the system information of the multi-split air conditioning system corresponding to the identification code and sending, by the cloud server, the system information to the debugging terminal when the debugging terminal is not currently blocked.

5. The centralized control method for the multi-split air conditioning system according to claim 4, wherein searching for, by the cloud server, the system information of the multi-split air conditioning system corresponding to the identification code and sending, by the cloud server, the system information to the debugging terminal when the debugging terminal is not currently blocked comprises:
    determining, by the cloud server, whether the system information corresponding to the identification code exists in a preset database when the debugging terminal is not currently blocked;
    sending, by the cloud server, the system information corresponding to the identification code to the debugging terminal when the system information corresponding to the identification code exists in the preset database; and
    sending, by the cloud server, identification code error information to the debugging terminal when the system information corresponding to the identification code does not exist in the preset database.

6. The centralized control method for the multi-split air conditioning system according to claim 1, wherein upon creating the project, uploading, by the debugging terminal, project information corresponding to the project to the cloud server comprises:
 upon creating the project, performing, by the debugging terminal, a corresponding processing on the project based on the system information; and
 upon completing processing, uploading, by the debugging terminal, the project information corresponding to the project to the cloud server.

7. The centralized control method for the multi-split air conditioning system according to claim 1, wherein before upon acquiring the identification code of the outdoor unit of the multi-split air conditioning system, sending, by the debugging terminal, the first acquisition request to the cloud server based on the identification code, the centralized control method for the multi-split air conditioning system further comprises:
 upon installation of the multi-split air conditioning system, sending, by the outdoor unit of the multi-split air conditioning system, the identification code of the outdoor unit and the system information of the multi-split air conditioning system to the cloud server; and
 storing, by the cloud server, the identification code and the system information received in association with each other.

8. The centralized control method for the multi-split air conditioning system according to claim 1, wherein the outdoor unit is provided with a mobile communication module, and the outdoor unit is communicated with the cloud server via the mobile communication module.

9. A centralized control system for a multi-split air conditioning system comprises:
 a memory,
 a processor, and
 a centralized control program of the multi-split air conditioning system stored in the memory and executable by the processor that, when executed by the processor, causes the processor to perform steps of a centralized control method for the multi-split air conditioning system according to claim 1.

10. A non-transitory computer-readable storage medium having stored therein a centralized control program of a multi-split air conditioning system that, when executed by a processor, causes the processor to perform a centralized control method for the multi-split air conditioning system according to claim 1.

* * * * *